United States Patent
Gorzela et al.

(10) Patent No.: US 10,984,391 B2
(45) Date of Patent: Apr. 20, 2021

(54) INTELLIGENT MEETING MANAGER

(71) Applicant: International Business Machines Corporation, Armonk, NY (US)

(72) Inventors: Richard Gorzela, Andover, MA (US); Asima Silva, Holden, MA (US); Jaime M. Stockton, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 595 days.

(21) Appl. No.: 15/353,796

(22) Filed: Nov. 17, 2016

(65) Prior Publication Data

US 2018/0137472 A1    May 17, 2018

(51) Int. Cl.
*G06Q 10/10*    (2012.01)
*H04L 29/06*    (2006.01)

(52) U.S. Cl.
CPC ....... *G06Q 10/1095* (2013.01); *G06Q 10/109* (2013.01); *H04L 65/403* (2013.01)

(58) Field of Classification Search
CPC combination set(s) only.
See application file for complete search history.

(56) References Cited

U.S. PATENT DOCUMENTS

| | | | |
|---|---|---|---|
| 6,219,415 B1 | 4/2001 | Deutsch | |
| 6,757,260 B2 | 6/2004 | Pandit | |
| 7,136,458 B1 | 11/2006 | Zellner | |
| 8,107,596 B1 | 1/2012 | Gentle | |
| 8,527,287 B1 * | 9/2013 | Bhatia | G06Q 10/109 705/1.1 |
| 8,743,171 B2 * | 6/2014 | Hiller | G06Q 10/06 348/14.01 |
| 9,111,263 B2 | 8/2015 | Li et al. | |
| 9,269,092 B2 | 2/2016 | Dyer | |
| 9,635,061 B2 | 4/2017 | McCormack | |
| 2003/0004776 A1 | 1/2003 | Perrella et al. | |

(Continued)

FOREIGN PATENT DOCUMENTS

JP    2009277013 A    11/2009

OTHER PUBLICATIONS

"Best Meeting Software / 2016 Reviews of the Most Popular Systems," [online] Capterra, The Smart Way to Find Business Software [retrieved Oct. 30, 2016], retrieved from the Internet: <http://www.capterra.com/meeting-software/>, 22 pg.

(Continued)

*Primary Examiner* — Patricia H Munson
*Assistant Examiner* — Crystol Stewart
(74) *Attorney, Agent, or Firm* — Cuenot, Forsythe & Kim, LLC

(57) ABSTRACT

Managing a meeting can include analyzing, using a processor, dialog of the meeting to detect a closing indicator in response to determining that a scheduled end time of a meeting currently in progress is approaching. In the event that the closing indicator is not detected within the dialog, determining, using the processor, availability of an attendee of the meeting to continue in the meeting beyond the scheduled end time. A notification of the scheduled end time of the meeting can be provided, using the processor, in response to determining that the attendee of the meeting is not available to continue in the meeting beyond the scheduled end time.

20 Claims, 3 Drawing Sheets

(56) References Cited

U.S. PATENT DOCUMENTS

| | | | |
|---|---|---|---|
| 2003/0014491 A1* | 1/2003 | Horvitz | G06Q 10/109 709/206 |
| 2003/0046304 A1 | 3/2003 | Peskin et al. | |
| 2003/0125954 A1 | 7/2003 | Bradley | |
| 2003/0231746 A1 | 12/2003 | Hunter | |
| 2004/0003042 A1* | 1/2004 | Horvitz | G06Q 10/109 709/204 |
| 2004/0136515 A1 | 7/2004 | Litwin | |
| 2006/0224430 A1 | 10/2006 | Butt | |
| 2007/0112926 A1 | 5/2007 | Brett et al. | |
| 2007/0118415 A1 | 5/2007 | Chen et al. | |
| 2008/0040187 A1* | 2/2008 | Carraher | G06Q 10/109 705/7.19 |
| 2009/0172120 A1 | 7/2009 | Ruelas | |
| 2009/0271438 A1 | 10/2009 | Agapi et al. | |
| 2010/0228577 A1 | 9/2010 | Cunningham | |
| 2011/0072362 A1* | 3/2011 | Denner | G06Q 10/109 715/751 |
| 2011/0075829 A1 | 3/2011 | Goldman | |
| 2011/0252097 A1 | 10/2011 | Walker | |
| 2011/0257881 A1 | 10/2011 | Chen | |
| 2012/0011205 A1* | 1/2012 | Paulsami | G06Q 10/1095 709/206 |
| 2012/0173135 A1 | 7/2012 | Gutman | |
| 2013/0038673 A1* | 2/2013 | Hiller | G06Q 10/06 348/14.07 |
| 2014/0108085 A1* | 4/2014 | Henriksen | G06Q 10/1095 705/7.19 |
| 2014/0164510 A1* | 6/2014 | Abuelsaad | H04L 65/403 709/204 |
| 2015/0302363 A1* | 10/2015 | Wang | G06Q 10/1095 705/7.19 |
| 2017/0308866 A1* | 10/2017 | Dotan-Cohen | H04L 43/0876 |
| 2017/0316385 A1* | 11/2017 | Joshi | G01C 21/26 |
| 2019/0197490 A1 | 6/2019 | Silva et al. | |

OTHER PUBLICATIONS

IBM: List of IBM Patents or Patent Applications Treated As Related, 2 pg.

Silva et al., "Electronic Meeting Time of Arrival Estimation," U.S. Appl. No. 15/851,429, filed Dec. 21, 2017, 31 pages. (a copy is not provided as this application is available to the Examiner.

* cited by examiner

INTELLIGENT MEETING MANAGER

BACKGROUND

This disclosure relates to meeting systems and, more particularly, to managing scheduled meetings and the closing of scheduled meetings.

Different types of meetings such as conference calls, Web-based meetings, virtual meetings, etc., are often scheduled using electronic calendar systems. The meetings have definitive start times and end times. In many cases, the meetings run longer than scheduled. While some attendees may be able to continue in the meeting beyond the scheduled end time, other attendees may not due to scheduling conflicts.

A number of awkward situations and potentially negative consequences may arise from a meeting overrun. In one example, the meeting organizer may need to interrupt the discussion to ask whether each attendee is able to continue in the meeting beyond the scheduled end time or to schedule a follow-up meeting. These sorts of interruptions may derail the meeting discussion, may waste time, and may constrain the flow of ideas for the remaining meeting time.

In another example, an attendee may be forced to interrupt the current speaker to notify the other attendees of that individual's need to leave the meeting. In some cases, one may need permission from another attendee, e.g., a supervisor, in order to leave the meeting. Some attendees may consider interrupting in this manner and/or leaving the meeting to be rude behavior or an annoyance that could jeopardize relationships among the meeting attendees.

SUMMARY

One or more embodiments are directed to methods of managing a meeting. In one aspect, a method can include, in response to determining that a scheduled end time of a meeting currently in progress is approaching, analyzing, using a processor, dialog of the meeting for a closing indicator. The method can include, in response to determining that the dialog does not include the closing indicator, determining, using the processor, availability of an attendee of the meeting to continue in the meeting beyond the scheduled end time. The method may also include providing, using the processor, a notification of the scheduled end time of the meeting in response to determining that the attendee of the meeting is not available to continue in the meeting beyond the scheduled end time.

One or more embodiments are directed to systems for managing a meeting. In one aspect, a system includes a processor configured to initiate executable operations. The executable operations can include, in response to determining that a scheduled end time of a meeting currently in progress is approaching, analyzing, using a processor, dialog of the meeting for a closing indicator. The executable operations can include, in response to determining that the dialog does not include the closing indicator, determining, using the processor, availability of an attendee of the meeting to continue in the meeting beyond the scheduled end time. The executable operations can also include providing, using the processor, a notification of the scheduled end time of the meeting in response to determining that the attendee of the meeting is not available to continue in the meeting beyond the scheduled end time.

One or more embodiments are directed to a computer program product for managing a meeting. The computer program product can include a computer readable storage medium having program instructions embodied therewith. In one aspect, the program instructions are executable by a processor to cause the processor to initiate executable operations. The executable operations can include, in response to determining that a scheduled end time of a meeting currently in progress is approaching, analyzing, using the processor, dialog of the meeting to detect a closing indicator. The executable operations can also include, in response to determining that the dialog does not include the closing indicator, determining, using the processor, availability of an attendee of the meeting to continue in the meeting beyond the scheduled end time. The executable operations further can include providing, using the processor, a notification of the scheduled end time of the meeting in response to determining that the attendee of the meeting is not available to continue in the meeting beyond the scheduled end time.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to meeting systems and, more particularly, to managing scheduled meetings and the closing of scheduled meetings. One or more embodiments described within this disclosure are directed to methods, systems, and computer program products adapted for managing meeting times. A system, for example, is capable of determining whether a meeting that is currently in progress is starting to close down or "wrap-up." The system is capable of analyzing content of the meeting such as dialog between attendees of the meeting. The system is capable of analyzing content of the meeting to detect indicators that the meeting is coming to a close in compliance with the scheduled end time of the meeting.

In cases where the scheduled end time of the meeting is approaching and the system does not detect any closing indicators in the content, the system is capable of determining whether the attendees of the meeting are able to continue participating in the meeting beyond the scheduled end time for the meeting. Based upon the availability of the attendees to continue, the system may provide one or more notifications that the scheduled end time of the meeting is approaching.

Accordingly, the system is capable of intelligently evaluating whether the meeting is actually coming to a close in alignment with the scheduled end time of the meeting based upon analysis of the meeting content. In this manner, the system may provide notifications, which may disrupt the dialog and/or flow of the meeting, when needed as opposed to providing such notifications as a matter of routine. In cases where the system is able to determine that the meeting is coming to a close in alignment with the scheduled end time, for example, the system does not provide notifications of the approaching meeting end so as to avoid any unnecessary disruption of the meeting. As such, the meeting system effectively allows the current meeting to continue beyond the scheduled end time.

Figure 1:
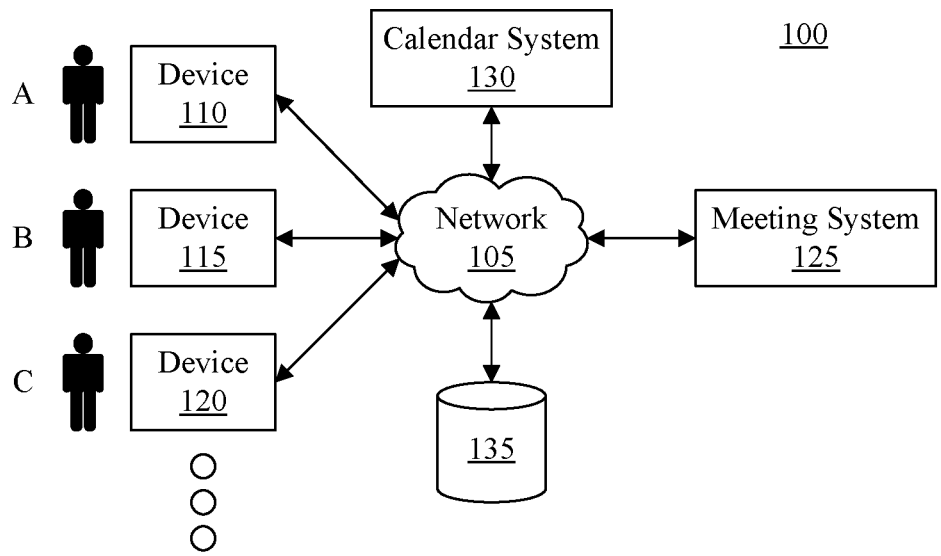
FIG. 1 illustrates an example of a network computing system.

FIG. 1 illustrates an example of a network computing system 100 in which the inventive arrangements may be implemented. In the example of FIG. 1, network computing system 100 contains a network 105, devices 110, 115, and 120, a meeting system 125, a calendar system 130, and a data storage device 135. The noted elements are interconnected, e.g., communicatively linked, by network 105.

Network 105 is the medium used to provide communications links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Devices 110, 115, and 120 are capable of coupling to network 105 via wired and/or wireless communication links. Devices 110, 115, and/or 120 may be implemented as personal computers, portable computing or communication devices, network computers, tablet computers, mobile phones such as smart phones, telephones which may include Voice-Over IP (VoIP) phones, etc. Further, device 110 may be implemented as one type of device, while device 115 is implemented as another different type of device, while device 120 is implemented as yet another different type of device. Devices 110, 115, and 120 may establish audio, video, audiovisual, or other types of communication sessions with meeting system 125 through network 105 to enable users A, B, and C of devices 110-120, respectively, to participate in meetings as attendees.

Meeting system 125 is capable of coupling to network 105 via wired and/or wireless communication links. In one aspect, meeting system 125 is implemented as one or more interconnected computer systems, e.g., servers. Meeting system 125 is capable of executing suitable operational software to support the various operations described herein. In an example, meeting system 125 is capable of establishing communication links with devices 110-120 so that users of devices 110-120 may participate in a meeting together. The term "meeting," as used herein, refers to an assembly of two or more people using electronic devices to communicate concurrently with one another over one or more communication channels that support concurrent, two-way (e.g., bi-directional) communication.

Examples of meetings include, but are not limited to, a teleconference, a videoconference, a Web-based conference, a virtual meeting supporting screen-sharing, and so forth. It should be appreciated that a meeting may use a mix of technologies where different devices connect to the meeting using different technologies and/or communication channels. Further, devices may have different capabilities in the meeting. For example, user A using device 110 may join a meeting by using device 110 to call into the meeting and participate only through an audio connection. User B may use device 115 to join the same meeting using a virtual meeting application that supports audio, video, and/or screen sharing.

Calendar system 130 is capable of coupling to network 105 via wired and/or wireless communication links. In one aspect, calendar system 130 is implemented as one or more interconnected computer systems, e.g., servers. Calendar system 130 is capable of storing calendar data, e.g., schedules, for a plurality of users. The users may be members of an organization. For purposes of illustration, calendar system 130 stores calendar data for users A, B, and C. Calendar data for a user includes or specifies a list of meetings that the user is scheduled to attend. The calendar data may be stored within a data structure within calendar system 130. For example, a data structure representing a meeting may include a start time, an end time, a meeting title, optionally a description or agenda, optionally attendees of the meeting, etc.

Data storage device 135 is capable of coupling to network 105 via wired and/or wireless communication links. Data storage device 135 may be implemented as a data processing system such as a server, a network addressable storage device, and so forth. Data storage device 135 is capable of storing organizational data for an entity or organization as one or more data structures. For example, data storage device 135 may store a directory of members of the entity, an organizational chart for an entity indicating hierarchical positions and relationships of the members of the entity, the titles and/or roles of members of the entity, responsibilities of members of the entity, seniority of members of the entity, etc.

Meeting system 125 is capable of accessing or querying data storage device 135. Meeting system 125 is capable of obtaining information stored within data storage device 135 for one or more or each attendee of a meeting that was conducted in the past, e.g., prior meetings, an ongoing or current meeting, and/or for one or more future meetings. Meeting system 125 is also capable of accessing or querying calendar system 130. Meeting system 125 is capable of obtaining information stored within calendar system 130 for one or more or each attendee of a current or ongoing meeting.

For purposes of illustration, consider an example where user A, user B, and user C are participating in a meeting conducted by meeting system 125. Users A, B, and C participate in the meeting as attendees using devices 110, 115, and 120, respectively. The meeting is in progress and has a scheduled end time within meeting system 125.

Meeting system 125 is capable of using cognitive analysis of the current meeting and/or past meetings to learn and determine whether the current meeting is closing as the scheduled end time approaches.

Meeting system 125 is capable of using a variety of techniques and/or technologies such as speech recognition, Natural Language Processing (NLP), and so forth to convert dialog of attendees of the meeting to text. Meeting system 125 is capable of analyzing the text for closing indicators. A closing indicator refers to a portion of text such as a word and/or phrase that signifies that the meeting is finishing. Examples of text that may be used as closing indicators include, but are not limited to, summarizing statements, text indicating next steps, text indicating action items, etc.

For example, meeting system 125 is capable of determining that the scheduled meeting time is approaching and that the dialog of the current meeting does not indicate that the meeting is finishing. In that case, meeting system 125 is capable of evaluating calendar data, e.g., the calendars or schedules, of one or more or all of the meeting attendees. Meeting system 125, for example, is capable of evaluating the calendar of each of attendees A, B, and C as obtained from calendar system 130 to determine availability of attendees A, B, and C. Meeting system 125 is capable of determining, for example, whether attendees A, B, and C have other commitments directly following the current meeting that would conflict if the current meeting were to continue past the scheduled ending time. Meeting system 125 may perform additional cognitive analysis to determine availability of attendees A, B, and C to continue the current meeting beyond the scheduled end time as described herein in greater detail with reference to the remaining figures.

In another example, meeting system 125 is capable of selectively providing notifications relating to the scheduled end time of the current meeting as the end time approaches based upon availability of the attendees. For example, in cases where one or more of the attendees is unable to continue participating in the current meeting beyond the scheduled end time and meeting system 125 does not detect any closing indicators, meeting system 125 may provide one or more notifications that the meeting is scheduled to end soon. Meeting system 125 may provide the notifications with increasing intensity as the scheduled end of the meeting draws closer in time. In another aspect, meeting system 125 is capable of scheduling, or attempting to schedule, another meeting.

In cases where meeting system 125 determines that attendees A, B, and C are available to participate in the current meeting beyond the scheduled end time, meeting system 125 is capable of not taking any further action or providing any notification. For example, meeting system 125 allows the current meeting to continue past the scheduled end time. By actively determining that attendees A, B, and C are able to continue participating in the current meeting past the scheduled end time, meeting system 125 avoids disrupting or otherwise interrupting the dialog and/or flow of the meeting unnecessarily.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, clients, and other devices. In addition, one or more of the elements illustrated in network computing system 100 may be merged or combined.

Figure 2:
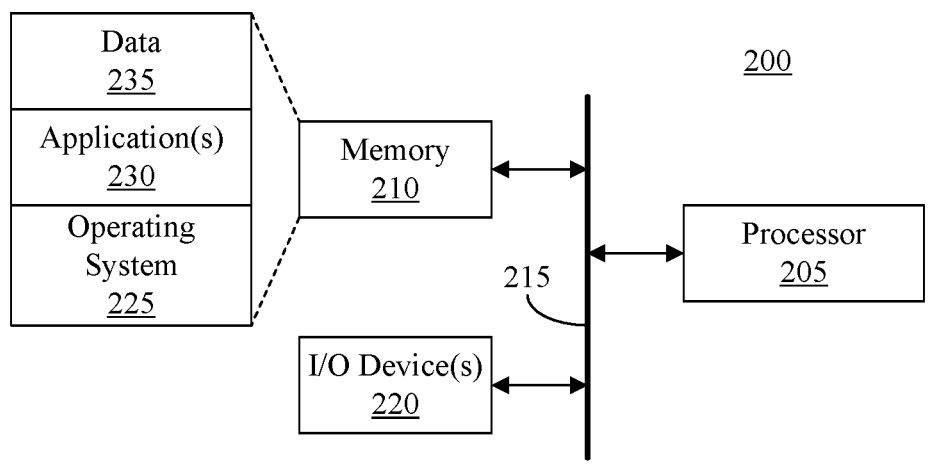
FIG. 2 illustrates an example of a data processing system.

FIG. 2 illustrates an example architecture 200 for a data processing system. In one aspect, architecture 200 may be used to implement one or more of devices 110, 115, or 120 of FIG. 1. In another aspect, architecture 200 may be used to implement messaging system 125 and/or calendar system 130.

As pictured, architecture 200 includes at least one processor 205 coupled to a memory 210 through interface circuitry 215. Examples of interface circuitry 215 include but are not limited to, an input/output (I/O) subsystem, an I/O interface, a bus system, a memory interface, or other suitable circuitry. Architecture 200 stores computer readable instructions (also referred to as "program code") within memory 210. Memory 210 may be considered an example of computer readable storage media. Processor 205 executes the program code accessed from memory 210 via interface circuitry 215.

Memory 210 can include one or more physical memory devices such as, for example, a local memory and one or more bulk storage devices. Local memory refers to random access memory (RAM) or other non-persistent memory device(s) generally used during actual execution of the program code. A bulk storage device may be implemented as a non-volatile memory such as a hard disk drive (HDD), a solid state drive (SSD), or another persistent data storage device. Architecture 200 may also include one or more cache memories (not shown) that provide temporary storage of at least some program code in order to reduce the number of times program code must be retrieved from the bulk storage device during execution.

Architecture 200 may be coupled to one or more I/O devices 220. Examples of I/O devices 220 can include, but are not limited to, a keyboard, a display device, a pointing device, a speaker, a microphone, one or more network adapters, and so forth. A network adapter enables architecture 200 to become coupled to other systems, computer systems, remote printers, and/or remote storage devices. Examples of network adapters may include, but are not limited to, modems, Ethernet cards, bus adapters, wireless transceivers and/or radios, and so forth. Architecture 200 may include one or more additional I/O device(s) beyond the examples provided. The I/O devices described herein may be coupled to architecture 200 either directly or through intervening I/O controllers.

As pictured, memory 210 may store an operating system 225, one or more application(s) 230, and data 235. In one aspect, operating system 225 and application 230, being implemented in the form of executable program code, are executed by architecture 200 and, more particularly, by processor 205, to perform the various operations described within this disclosure. As such, operating system 225 and application 230 may be considered an integrated part of architecture 200. For example, operating system 225, application 230, and any data (e.g., data 235) used, generated, and/or operated upon by architecture 200 are functional data structures that impart functionality when employed as part of architecture 200.

Architecture 200 may include fewer components than shown or additional components not illustrated in FIG. 2 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

Figure 3:
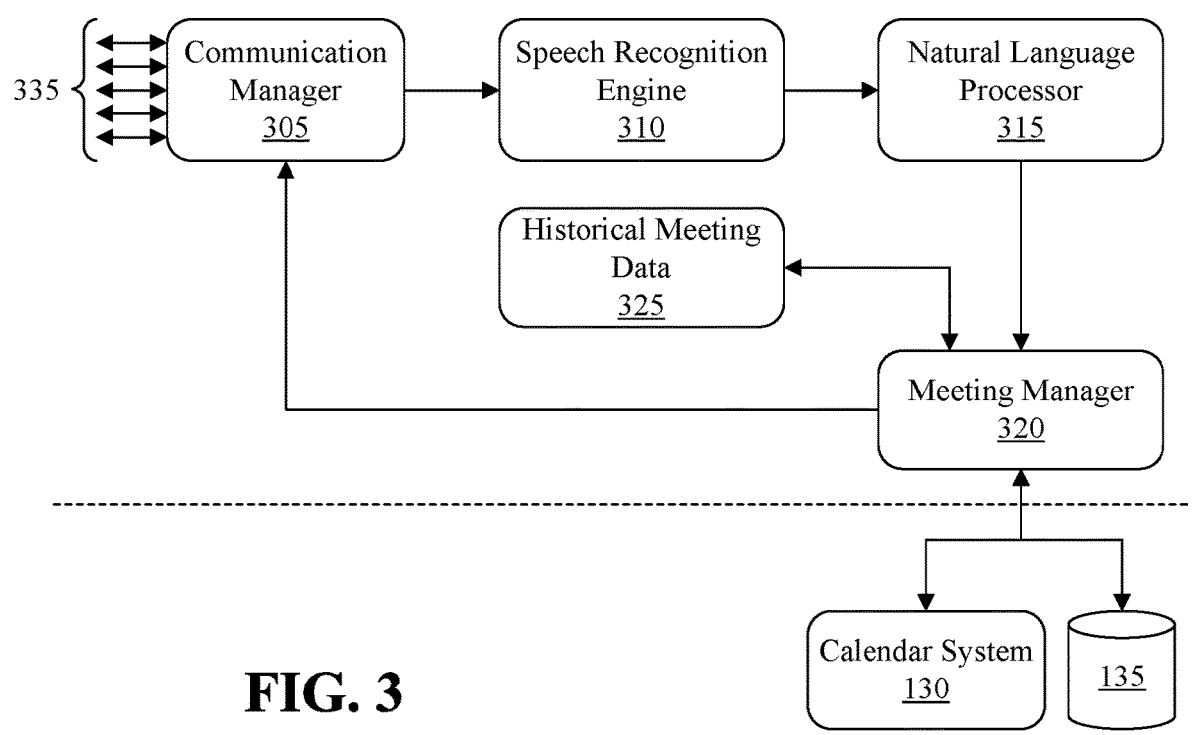
FIG. 3 illustrates an example architecture for a meeting system.

FIG. 3 illustrates an example implementation of a meeting system. For example, FIG. 3 illustrates a general software architecture that may be executed by meeting system 125 of FIG. 1. In one aspect, the meeting system includes a communication manager 305, a speech recognition engine 310, a natural language processor (NL processor) 315, and a meeting manager 320. Communication manager 305, speech recognition engine 310, NL processor 315, and meeting manager 320 may be implemented as executable program code stored and executed by meeting system 125.

In an example, the meeting system can include historical meeting data 325. Historical meeting data 325 indicates which users listed as attendees of prior meetings actually joined the meetings, the roles of the attendees for the meetings, and the like. Calendar data 130 and data storage device 135 are shown for purposes of clarity. In another example, historical meeting data 325 may be stored within, and accessed from, calendar system 130.

Communication manager 305 is capable of establishing and maintaining communication links 335 with attendee devices for a meeting. In one aspect, communication manager 305 is capable of routing video, audio, images, and other content among the attendee devices. Communication manager 305 is capable of providing one or more audio feeds (hereafter "audio signals") of the meeting to speech recognition engine 310. In one aspect, communication manager 305 is capable of providing an audio signal that is a mix of each audio signal from an attendee device to speech recognition engine 310. In another aspect, communication manager 305 is capable of providing individual audio signals, e.g., one audio signal from each attendee device, to speech recognition engine 310 for processing. Communication manager 305 is capable of providing an indication of which attendee is speaking for the audio signal(s) provided to speech recognition engine 310. In this manner, speech received from an attendee device is attributable to a particular attendee.

Speech recognition engine 310 is capable of operating on received audio signals and converting speech contained or encoded in the audio signals into text. In one aspect, speech recognition engine 310 is capable of operating on received audio signal(s) in real time. Thus, the meeting system is capable of generating a transcript of the dialog occurring in an ongoing meeting in real time. In any case, speech recognition engine 310 is capable of providing the speech recognized text to NL processor 315.

NL processor 315 is capable of performing NLP. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, NL processor 315 is capable of performing semantic analysis. Semantic analysis may follow parsing and involve extraction of context-independent aspects of a sentence's meaning, including entities, named entities, the semantic roles of entities mentioned in the sentence, and quantification information, such as cardinality, iteration, and dependency.

In an example, NL processor 315 is capable of detecting particular terms, phrases, etc., from within the speech recognized text (e.g., the transcript). For example, NL processor 315 is capable of operating on the speech recognized text to detect closing indicators such as summarizing statements, concluding statements, and so forth. Examples of summarizing statements can include, but are not limited to, "in summary," "summarizing," etc. Examples of concluding statements can include, but are not limited to, "in conclusion," "concluding," "action item," "in the time remaining," etc. Particular statements or phrases relating to the creation of "action items," the assignment of action items to particular attendees, or other verbiage associated with the ending or closing of a meeting may be added to the list of words and/or phrases that NL processor 315 is capable of detecting that signify or indicate that the conversation of the meeting is ending.

Meeting manager 320 is capable of accessing historical meeting data 325 and/or calendar data. In an example, meeting manager 320 is capable of determining availability of attendees of an ongoing meeting. Meeting manager 320, for example, is capable of determining, from calendar system 130, whether an attendee of the current meeting has another meeting scheduled that follows the scheduled end time of the current meeting such that extending the current meeting beyond the scheduled end time would conflict with the other scheduled meeting. Meeting manager 320 is also capable of instructing communication manager 305 to provide one or more indications of the approaching end time of the meeting in selected cases as described herein.

For purposes of illustration, consider an example where attendee A begins a meeting that is scheduled for thirty minutes. The meeting is a design review type of meeting. Attendees join the meeting via telephone and via Web connections. At 22 minutes into the meeting, attendee A still has 5 more slides to discuss. In one example, meeting manager 320 may generate a signal to attendee A indicating that 8 minutes remain in the meeting. For example, meeting manager 320 may cause communication manager 305 to provide the notification when the scheduled end time of the meeting is within a predetermined amount of time from the current time and NL processor 315 has not detected any closing indicator in the dialog of the meeting.

In another example, meeting manager 320 is capable of determining whether attendees of the current meeting are required. For example, attendee B may be a team lead, while attendee C may be a project manager. In this example, both of attendees B and C are required to approve the design being discussed in the meeting. Another attendee D may be optional for the current meeting as attendee D may not need to give approval. Meeting manager 320 may determine that attendee D has another meeting scheduled directly after the current meeting. Because attendee D is optional for the current meeting, meeting manager 320 need not provide any notification of the scheduled end time of the meeting since attendee D may leave the meeting in the event that the current meeting continues beyond the scheduled end time.

Meeting manager 320 further may determine that attendee B does not have any meetings scheduled directly after the scheduled end time of the current meeting. Meeting manager 320 may determine that attendee C does have a meeting immediately after the scheduled end time of the current meeting. Further, meeting manager 320 may determine that the meeting for attendee C following the current meeting is important. Accordingly, at 28 minutes into the current meeting, attendee A may have 2 slides remaining to discuss. In the case where no closing indicators are detected from the dialog, meeting manager 320 is capable of instructing communication manager 305 to provide attendee A with a notification that time for the meeting is running out. In another example, meeting manager 320 may cause communication manager 305 to send a notification to the phone of attendee A indicating that time for the current meeting running out.

Having been notified of the approaching end of the current meeting, attendee A may schedule a follow-up meeting. In this example, the meeting system does not detect any closing indicators, determines that at least one attendee of the current meeting is required, and that the required attendee has a conflict that prevents the current meeting from being extended and continuing past the scheduled end time. Accordingly, the meeting system provides a notification of the approaching scheduled end time of the meeting thereby allowing the speaker to bring the meeting to a close and take any additional action that may be necessary in terms of scheduling a follow-up meeting. Operation of the meeting system causes the meeting to end at the scheduled end time and avoids the need for an attendee to interrupt to indicate that attendee needs to exit or drop from the meeting.

In another aspect, the meeting system is capable of providing notifications of differing detail. For example, the meeting system is capable of providing a notification indicating an amount of time remaining in the current meeting. In another example, the meeting system is capable of providing a notification indicating which attendees have conflicts, etc. Referring to the foregoing example, the meeting system is capable of providing attendee A with a notification indicating that attendee C has a conflict.

Figure 4:
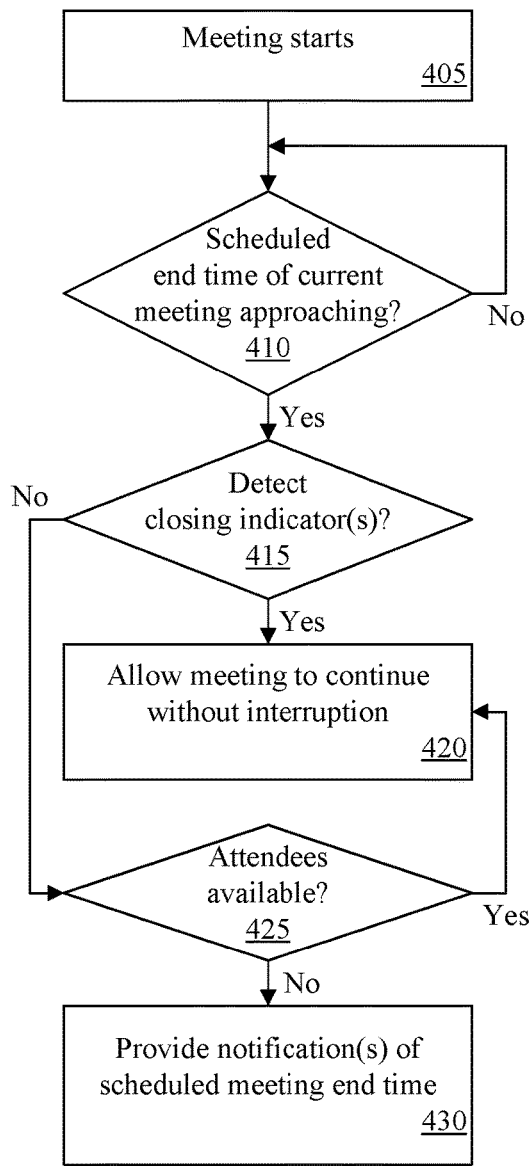
FIG. 4 illustrates an example method of managing a meeting.

FIG. 4 illustrates an example method 400 of managing a meeting. Method 400 may be performed by a system such as meeting system 125 described in connection with FIGS. 1, 2, and 3 of this disclosure. In block 405, the meeting system starts a meeting between a plurality of attendees. Each of the attendees connects to the meeting system through a suitable device, whether a mobile phone, a telephone, a computer or other data processing system, etc.

In block 410, the meeting system determines whether the scheduled end time of the current meeting is approaching. In response to the meeting system determining that the scheduled end time of the current meeting is approaching, method 400 continues to block 415. In response to the meeting system determining that the scheduled end time of the current meeting is not approaching, method 400 may continue to loop and check for the scheduled end time of the current meeting.

In an example, the meeting system is capable of monitoring the current time and detecting when the scheduled end time of the current meeting is a predetermined amount of time, or within a predetermined amount of time, from the current time. In response to detecting that the scheduled end time of the current meeting is a predetermined amount of time from the current time or within a predetermined amount of time from the current time, the meeting system determines that the scheduled end time of the current meeting is approaching. For example, the meeting system may be configured to detect when the scheduled end time of the current meeting is 15 minutes away from the current time (e.g., will occur in 15 minute), 10 minutes away from the current time, 5 minutes away from the current time, etc. The meeting system may compare the scheduled end time of the current meeting with the current time. In an example implementation, the time threshold that is applied may be adjusted and/or set as a meeting system setting.

In block 415, the meeting system determines whether one or more closing indicators are detected from the dialog taking place in the current meeting. In one example, the meeting system may determine whether one or more closing indicators are detected within a window of time such as within the last N minutes, where N is an integer value. If the meeting system detects one or more closing indicators, method 400 continues to block 420. If the meeting system does not detect any closing indicators, method 400 proceeds to block 425.

In an example, the meeting system is capable of converting speech of the attendees into text in real time and processing the text using NLP or other processing techniques. The meeting system is capable of determining whether the conversation taking place in the current meeting includes one or more closing indicators. As discussed, the closing indicators are words and/or phrases detected within the speech recognized text that are indicative that one or more of the attendees of the meeting is/are aware of the approaching scheduled end time of the meeting. The closing indicators denote that conversation of the meeting is coming to a close or "wrapping-up" in anticipation of the scheduled end time.

In another example, the particular words and/or phrases that are considered to be closing indicators may vary based upon the type of meeting that is taking place. For example, the meeting system may store a set of one or more closing indicators for one or more different meeting types. Thus, based upon the particular type of meeting that is taking place, the meeting system attempts to detect one or more closing indicators that are specific to the particular type of the current meeting. As an illustrative example, the closing indicators for a design meeting may be different than the closing indicators of a scrum meeting.

In block 420, the meeting system effectively determines that the attendees of the meeting are aware of the approaching scheduled end time of the current meeting. As such, the meeting system takes no action in relation to providing notifications of the approaching scheduled end time. The meeting systems allows the current meeting to continue without interruption.

In one aspect, the meeting system may extend the current meeting for a predetermined amount of time. For example, the meeting system may move the scheduled end time out 5 minutes, 10 minutes, etc. The amount of time may be set as a system preference. In any case, the meeting system may perform the process anew as the meeting time is extended. For example, as the rescheduled end time approaches, e.g., is within a predetermined amount of time of the current time, the meeting system may perform a method such as method 400 anew.

In block 425, the meeting system has determined that, based upon an analysis of the conversation taking place in the meeting, the attendees are likely unaware of the approaching scheduled end time. Accordingly, the meeting system, in block 425, determines availability of one or more or each attendee of the current meeting. Availability of attendees is described in greater detail herein in connection with FIG. 5. If the attendees are available, as determined by the meeting system, method 400 loops back to block 420. In the case where the attendees are available, the meeting system does not interrupt since the attendees are able to continue participating in the current meeting beyond the scheduled end time.

If one or more of the attendees is not available to continue participating in the current meeting, method 400 proceeds to block 430. In block 430, the meeting system provides one or more notifications that the scheduled end time of the meeting is approaching. In an example, the meeting system is capable of providing the notification to a selected attendee. For instance, the meeting system is capable of providing the notification to the meeting organizer, to the meeting presenter, to the meeting speaker, etc., depending upon configuration of the meeting system.

In one aspect, the meeting system is capable of automatically scheduling a follow-up meeting. For example, in the case where the system sends a notification in block 430, the meeting system may find available time for each attendee or for each required attendee by accessing the attendees calendar. The meeting system, for example, may automatically send an invite or meeting request to the attendees for the follow-up meeting.

In another example, whether the meeting system provides notifications may depend upon availability of selected attendees. For instance, the meeting system may provide a notification in the case where an attendee that is required for the current meeting is not available to continue in the current meeting beyond the scheduled end time. In the case where only an attendee or attendees that are not required for the current meeting are unavailable, but each required attendee is available, the meeting system may forego providing a notification.

Figure 5:
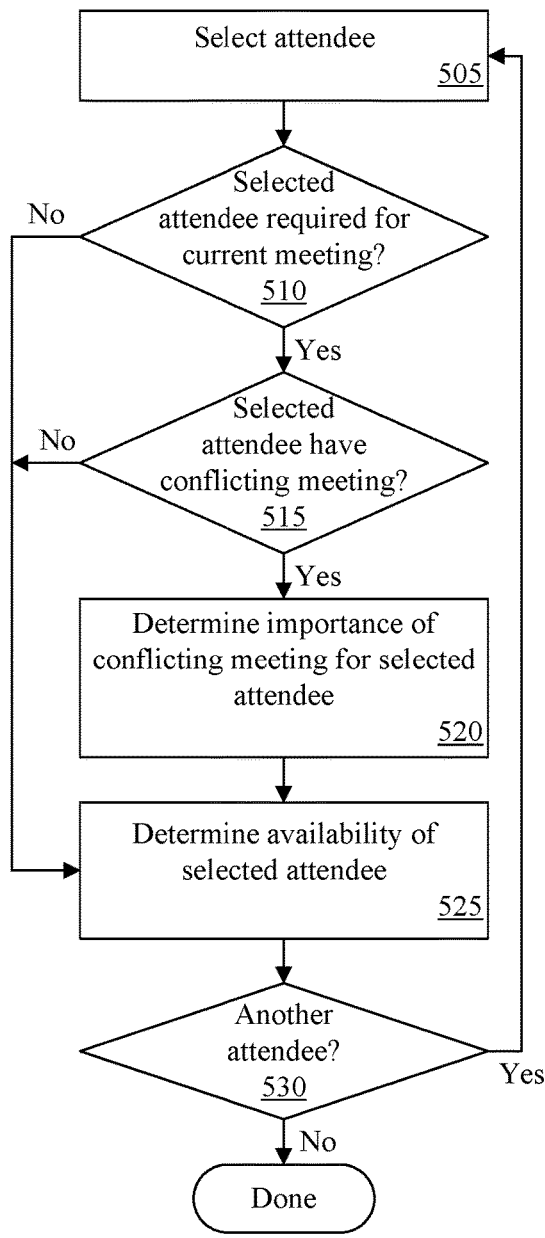
FIG. 5 illustrates an example method of determining availability of attendees for continuing in a meeting.

FIG. 5 illustrates an example method 500 of determining availability of attendees to continue in a meeting. For example, method 500 may be performed by the meeting system to implement block 425 of FIG. 4. In block 505, the meeting system selects an attendee of the current meeting.

In block 510, the meeting system determines whether the selected attendee is required for the current meeting. If the selected attendee is required for the current meeting, method 500 continues to block 515. If the selected attendee is not required for the current meeting method 500 continues to block 525. In an example, as part of the data structure specifying the meeting, attendees may be designated as required or not. The meeting system is capable of determining whether the selected attendee is required by reading the meeting data structure.

In block 515, the meeting system determines whether the selected attendee has a conflicting meeting. If so, method 500 continues to block 520. If not, method 500 continues to block 525. For example, the meeting system is capable of reading the calendar of the selected attendee to determine whether the selected attendee has a conflicting meeting. A conflicting meeting is a meeting involving the selected attendee that starts immediately following the scheduled end time of the current meeting. A conflicting meeting may be any meeting for which the selected attendee of the current meeting is scheduled to attend and that starts within a predetermined amount of time of the scheduled end time of the current meeting. For example, a conflicting meeting may be a meeting that starts at the scheduled end time of the current meeting, starts within 5 or 10 minutes of the scheduled end time of the current meeting, etc.

In block 520, the meeting system determines the importance of the conflicting meeting for the selected attendee. For example, if the conflicting meeting is considered important to the selected attendee, the selected attendee is likely to attend the conflicting meeting. As such, the meeting system determines that the selected attendee is not available to continue participating in the current meeting past the scheduled end time. If the conflicting meeting is considered unimportant to the selected attendee, the meeting system determines that the selected attendee is able to continue in the current meeting beyond the scheduled end time.

In one example, the meeting system is capable of determining whether the conflicting meeting is important based upon one or more factors. One example of a factor is meeting type. The meeting system is capable of learning different types of meetings over time. The meeting system is capable of determining a type of a meeting from the title of the meeting, a subject of the meeting, an agenda of the meeting, etc. Example types of meetings may include, but are not limited to, a scrum meeting, a design review, a technical discussion, a staff meeting, etc. The meeting system, for example, is capable of analyzing historical meeting data for the selected attendee for one or more different types of meetings.

Another example factor is meeting attendance. The meeting system is capable of analyzing historical meeting data for the selected attendee to determine whether the selected attendee actually attends meetings of the different types on a regular basis. For example, the meeting system may evaluate the historical meeting data to determine attendance of the selected attendee for different types of meetings. Low attendance of the selected attendee to meetings of a particular type, e.g., type A, indicates that the meetings of type A are not important to the selected attendee. High attendance of the selected attendee to meetings of type A indicates that meetings of type A are important to the selected attendee.

Another example factor is the role of the selected attendee in the conflicting meeting. The meeting system is capable of determining the role of the selected attendee in the conflicting meeting. For example, if the selected attendee is a meeting organizer or chair of the conflicting meeting, the meeting system deems the conflicting meeting to be important. If the selected attendee is marked as required for the conflicting meeting, the meeting system determines the conflicting meeting to be important.

Other example factors may include, but are not limited to, the relationship of the selected attendee to other persons that are listed to attend the conflicting meeting. For example, if the supervisor of the selected attendee is scheduled to attend the conflicting meeting, the meeting system may consider the conflicting meeting to be important to the selected attendee.

In an arrangement, the meeting system is capable of calculating a score indicating importance based upon the example factors described. For example, for each factor detected, the meeting system is capable of assigning a factor score to the selected attendee based upon the value of the factor that is detected. The meeting system may sum the factor scores to determine a final score indicating the importance of the conflicting meeting for the selected attendee.

As an illustrative and non-limiting example, the meeting system may assign a factor score to the conflicting meeting based upon the type of the conflicting meeting (e.g., where higher factor scores correspond to greater importance), assign another factor score to the conflicting meeting based upon attendance of the selected attendee for the type of the conflicting meeting, assign another factor score to the conflicting meeting based upon whether a supervisor of the selected attendee is scheduled to attend the conflicting meeting, assign another factor score to the conflicting meeting based upon the role of the selected attendee in the conflicting meeting, etc. The meeting system may sum the factor scores to generate the final score that indicates importance of the conflicting meeting.

In block 525, the meeting system determines availability of the selected attendee. In an example, the meeting system compares the final score of the conflicting meeting with a threshold score. For example, the meeting system determines that the selected attendee is available when the final score of the conflicting meeting does not exceed the threshold score. The meeting system determines that the selected attendee is not available when the final score of the conflicting meeting exceeds the threshold score.

It should be appreciated that the relative importance of the different factors may be varied by changing the factor scores assigned to the conflicting meeting based upon the determined factors. For example, the meeting system may assign a factor score to the conflicting meeting that exceeds the threshold score in response to determining that the role of the selected attendee in the conflicting meeting is "organizer."

In the case where method 500 continues from block 510 to block 525 because the selected attendee is not required for the current meeting, the meeting system is capable of determining that the selected attendee is available. In another example, where the selected attendee is not required for the current meeting, the meeting system may disregard the selected attendee for purposes of determining availability. For example, meeting system may exclude the selected attendee from consideration in block 425 of FIG. 4 when the selected attendee is not required for the current meeting.

In the case where method 500 continues from block 515 to block 525 because the selected attendee does not have a conflicting meeting, the meeting system determines that the selected attendee is available to continue participating in the current meeting beyond the scheduled end time.

In block 530, the meeting system determines whether there are any further attendees of the current meeting to evaluate for availability. If so, method 500 may loop back to block 505 to select a next attendee of the current meeting for evaluations. If not, method 500 may end.

FIGS. 4 and 5 are provided for purposes of illustration and are not intended to be limiting of the inventive arrangements. A meeting system as described herein may be configured to implement one or more additional features. For example, the meeting system may be configured to generate notifications to attendees in cases where the meeting system determines that the meeting is on track to complete on time based upon analysis of the dialog. In another example, the meeting system is capable of providing increasingly more noticeable indications that the meeting needs to close.

In one aspect, the determination of availability for an attendee may be performed in real time. The meeting system, for example, may access historical meeting data for the attendees. As the historical meeting data for an attendee changes over time, whether a given meeting is deemed important by the meeting system may also change. For example, the meeting system may consider a particular type of meeting unimportant for a particular attendee. As the attendee begins to attend that particular meeting type over time, the meeting system will rate that meeting type as having higher importance for the attendee. This type of learning accounts for changing responsibilities of users within an organization.

In another example, the meeting system is capable of monitoring meetings for subjects, attendees, and time allocation to form a tracking history, analyzing the tracking history to determine a prioritization criterion, identifying current goals for a current meeting including a target completion and essential attendees, and responsive to determining a problem with completing the current goals, adjusting the target completion based on an availability of the essential attendees.

For example, the meeting system can analyze schedules of the essential attendees to determine an availability for an additional extension of time and/or reschedule a new session for the current meeting based upon at least one essential attendee not being available for the additional extension of time. In response to determining that the essential attendees are available for the additional extension of time, the meeting system is capable of extending the current meeting for the additional extension of time. Further, the meeting system is capable of providing an indication to an attendee identifying an assessment of achieving the current goals and/or ending the current meeting by the scheduled end time.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a computer hardware system executing a meeting manager, comprising:
   conducting, as a meeting that includes audio dialog of the meeting and by the meeting manager, a communication session between a plurality of client devices respectively associated with a plurality of participants;
   obtaining, by the meeting manager and from an electronic calendar system, a scheduled end time of the meeting;
   converting, using a speech recognition engine, the audio dialog of the meeting into audio dialog text;
   analyzing, during the meeting and using natural language processing and based upon a determination a current time is within a predetermined amount of time prior to the scheduled end time, the audio dialog text to detect a presence of a closing identifier within the audio dialog text;
   performing, by the meeting manager and responsive to a determination that the audio dialog text does not include the closing indicator, an automated availability determination process for each of the plurality of participants; and
   automatically sending, responsive to the automated availability determination process and to at least one of the client devices, an electronic notification regarding the scheduled end time of the meeting,
   wherein the automated availability determination process determines availability of each of the plurality of participants to continue in the meeting beyond the scheduled end time.

2. The method of claim 1, wherein
   the calendar system is configured to store the scheduled end time of the meeting as calendar data.

3. The method of claim 1, wherein
   the automated availability process:
      identifies a conflicting meeting with one of the plurality of participants,
      calculates a score indicating importance of the conflicting meeting, and
      determines availability of the one of the plurality of participants based upon a comparison of the score to a threshold score.

4. The method of claim 3, wherein
   the score is calculated based upon a plurality of factors.

5. The method of claim 4, wherein
   one of the plurality of factors includes a type of the conflicting meeting.

6. The method of claim 4, wherein
   one of the plurality of factors is historical attendance of the one of the plurality of participants to meetings of a same type as the conflicting meeting.

7. The method of claim 1, wherein
   the closing indicator is specific to a type of the meeting.

8. A computer hardware system, comprising a hardware processor executing a meeting manager and configured to initiate executable operations including:
   conducting, as a meeting that includes audio dialog of the meeting and by the meeting manager, a communication session between a plurality of client devices respectively associated with a plurality of participants;
   obtaining, by the meeting manager and from an electronic calendar system, a scheduled end time of the meeting;
   converting, using a speech recognition engine, the audio dialog of the meeting into audio dialog text;
   analyzing, during the meeting and using natural language processing and based upon a determination a current time is within a predetermined amount of time prior to the scheduled end time, the audio dialog text to detect a presence of a closing identifier within the audio dialog text;
   performing, by the meeting manager and responsive to a determination that the audio dialog text does not include the closing indicator, an automated availability determination process for each of the plurality of participants; and
   automatically sending, responsive to the automated availability determination process and to at least one of the client devices, an electronic notification regarding the scheduled end time of the meeting,
   wherein the automated availability determination process determines availability of each of the plurality of participants to continue in the meeting beyond the scheduled end time.

9. The system of claim 8, wherein
   the calendar system is configured to store the scheduled end time of the meeting as calendar data.

10. The system of claim 8, wherein
   the automated availability process:
      identifies a conflicting meeting with one of the plurality of participants,
      calculates a score indicating importance of the conflicting meeting, and
      determines availability of the one of the plurality of participants based upon a comparison of the score to a threshold score.

11. The system of claim 10, wherein
   the score is calculated based upon a plurality of factors.

12. The system of claim 11, wherein
   one of the plurality of factors includes a type of the conflicting meeting.

13. The system of claim 11, wherein
   one of the plurality of factors is historical attendance of the one of the plurality of participants to meetings of a same type as the conflicting meeting.

14. The system of claim 8, wherein
   the closing indicator is specific to a type of the meeting.

15. A computer program product, comprising:
   a computer readable storage medium having program instructions embodied therewith, the program instructions, which when executed by a computer hardware system, cause the computer hardware system to perform:
   executing a meeting manager;
   obtaining, by the meeting manager and from an electronic calendar system, a scheduled end time of the meeting;
   converting, using a speech recognition engine, audio dialog of the meeting into audio dialog text;
   analyzing, during the meeting and using natural language processing and based upon a determination a current time is within a predetermined amount of time prior to the scheduled end time, the audio dialog text to detect a presence of a closing identifier within the audio dialog text;
   performing, by the meeting manager and responsive to a determination that the audio dialog text does not include the closing indicator, an automated availability determination process for each of a plurality of participants of the meeting respectively associated with a plurality of client devices; and automatically sending, responsive to the automated availability determination process and to at least one of the client devices, an electronic notification regarding the scheduled end time of the meeting, wherein the automated availability determination process determines availability of each of the plurality of participants to continue in the meeting beyond the scheduled end time.

16. The computer program product of claim 15, wherein the calendar system is configured to store the scheduled end time of the meeting as calendar data.

17. The computer program product of claim 15, wherein the automated availability process:
   identifies a conflicting meeting with one of the plurality of participants,
   calculates a score indicating importance of the conflicting meeting, and
   determines availability of the one of the plurality of participants based upon a comparison of the score to a threshold score.

18. The computer program product of claim 17, wherein the score is calculated based upon a plurality of factors.

19. The computer program product of claim 18, wherein one of the plurality of factors includes a type of the conflicting meeting.

20. The computer program product of claim 18, wherein one of the plurality of factors is historical attendance of the one of the plurality of participants to meetings of a same type as the conflicting meeting.

\* \* \* \* \*